US011252608B2

(12) United States Patent
Hwang et al.

(10) Patent No.: US 11,252,608 B2
(45) Date of Patent: Feb. 15, 2022

(54) METHOD AND APPARATUS FOR TRANSMITTING DATA IN WIRELESS COMMUNICATION SYSTEM

(71) Applicant: Samsung Electronics Co., Ltd., Suwon-si (KR)

(72) Inventors: Jaehyun Hwang, Anyang-si (KR); Seongryong Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/316,464

(22) PCT Filed: Jul. 13, 2017

(86) PCT No.: PCT/KR2017/007514
§ 371 (c)(1),
(2) Date: Jan. 9, 2019

(87) PCT Pub. No.: WO2018/021734
PCT Pub. Date: Feb. 1, 2018

(65) Prior Publication Data
US 2019/0297534 A1    Sep. 26, 2019

(30) Foreign Application Priority Data
Jul. 28, 2016  (KR) .................. 10-2016-0096458

(51) Int. Cl.
*H04W 28/10* (2009.01)
*H04L 12/707* (2013.01)
(Continued)

(52) U.S. Cl.
CPC ............. *H04W 28/10* (2013.01); *H04L 45/24* (2013.01); *H04L 47/263* (2013.01); *H04L 47/30* (2013.01);
(Continued)

(58) Field of Classification Search
CPC ......... H04L 45/24; H04L 47/30; H04L 47/36; H04L 47/263; H04L 47/283; H04L 47/28;
(Continued)

(56) References Cited

U.S. PATENT DOCUMENTS 6,434,620 B1 *   8/2002   Boucher ................. H04L 29/06
                                                  709/230
8,085,781 B2 *   12/2011  Munson .................. H04L 47/34
                                                  370/394

(Continued)

FOREIGN PATENT DOCUMENTS

KR    10-2014-0077936 A    6/2014
KR    10-2014-0134936 A    11/2014
(Continued)

OTHER PUBLICATIONS

Martin et al., "Methods and Apparatus for Accessing Selectable Application Processing of Data Packets in an Adaptive", Jan. 19, 2016, Talari Networks Incorporated, U.S. Appl. No. 62/280,448, Total pp. 50 (Year: 2016).*

(Continued)

*Primary Examiner* — Shah M Rahman
(74) *Attorney, Agent, or Firm* — Jefferson IP Law, LLP

(57) ABSTRACT

The present disclosure relates to a communication technique for converging an IoT technology with a 5G communication system for supporting a higher data transmission rate beyond a 4G system, and a system therefor. The present disclosure may be applied to an intelligent service (for example, a smart home, a smart building, a smart city, a smart car or connected car, healthcare, digital education, retail business, a security and safety related service, or the like) on the basis of a 5G communication technology and an IoT related technology. Disclosed are an apparatus for transmitting data through at least one of a first path and a second path, and a method therefor. A method for an apparatus according to an (Continued)

embodiment of the present invention may comprise the steps of: identifying the size of data transmittable through a first path during a reference time for a second path; comparing the identified data size with the buffer size of a reception device; and determining a transmission mode on the basis of a result of the comparison, and transmitting the data to the reception device according to the determined transmission mode.

11 Claims, 11 Drawing Sheets

(51) Int. Cl.
| | |
|---|---|
| *H04L 12/835* | (2013.01) |
| *H04L 12/805* | (2013.01) |
| *H04L 12/825* | (2013.01) |
| *H04W 72/12* | (2009.01) |
| *H04L 12/841* | (2013.01) |

(52) U.S. Cl.
CPC ............ *H04L 47/36* (2013.01); *H04W 72/12* (2013.01); *H04L 47/283* (2013.01)

(58) Field of Classification Search
CPC ....... H04L 47/34; H04L 47/40; H04L 47/722; H04W 28/10; H04W 72/12
See application file for complete search history.

(56) References Cited

U.S. PATENT DOCUMENTS

| | | | |
|---|---|---|---|
| 10,143,001 B2 | 11/2018 | Schliwa-Bertling et al. | |
| 10,271,241 B2* | 4/2019 | Kim | H04L 1/16 |
| 2005/0185621 A1* | 8/2005 | Sivakumar | H04L 1/1887 370/335 |
| 2007/0008884 A1* | 1/2007 | Tang | H04L 29/06 370/230 |
| 2011/0296006 A1* | 12/2011 | Krishnaswamy | H04L 69/165 709/224 |
| 2012/0236801 A1 | 9/2012 | Krishnaswamy et al. | |
| 2012/0320752 A1* | 12/2012 | Gouache | H04L 47/125 370/237 |
| 2013/0077501 A1 | 3/2013 | Krishnaswamy et al. | |
| 2014/0341023 A1 | 11/2014 | Kim et al. | |
| 2015/0085665 A1* | 3/2015 | Kompella | H04L 47/20 370/236 |
| 2016/0094465 A1 | 3/2016 | Park et al. | |
| 2016/0323062 A1* | 11/2016 | Yang | H03M 13/154 |
| 2017/0012861 A1* | 1/2017 | Blumenthal | H04L 67/28 |
| 2017/0034843 A1* | 2/2017 | Liu | H04L 45/24 |
| 2017/0207976 A1* | 7/2017 | Rovner | H04L 41/083 |

FOREIGN PATENT DOCUMENTS

| | | |
|---|---|---|
| KR | 10-2016-0036878 A | 4/2016 |
| WO | 2015/030641 A1 | 3/2015 |

OTHER PUBLICATIONS

Baidya et al., "Improving the performance of Multipath TCP over Heterogeneous Paths using Slow Path Adaptation", Jun. 2014, University of Texas at Dallas. Proc. IEEE Int. Conf. Commun. (ICC), pp. 3222-3227, Total pp. 6 (Year: 2014).*
Xu et al., "CMT-QA: Quality-Aware Adaptive Concurrent Multipath Data Transfer in Heterogeneous Wireless Networks", Nov. 2013, IEEE, IEEE Transactions on Mobile Computing, vol. 12, No. 11, pp. 2193-2205, Total pp. 13 (Year: 2013).*
Halepoto et al., "Scheduling over dissimilar paths using CMT-SCTP", Jul. 2015, IEEE, 2015 Seventh International Conference on Ubiquitous and Future Networks, pp. 535-540, Total pp. 6 (Year: 2015).*
Halepoto Imtiaz A et al: "Management of buffer space for the concurrent multipath transfer over dissimilar paths", IEEE pp. 61-66, XP032743391, Feb. 3, 2015.
Extended European Search Report dated May 3, 2019, issued in European Application No. 17834677.1.
Ferlin et al., BLEST: Blocking Estimation-based MPTCP Scheduler for Heterogeneous Networks, In: IFIP Networking 2016, Vienna, Austria, May 17-19, 2016, ISBN 978-3-901882-83-8, pp. 431-439.
Kang et al., A Multi-Connection TCP Scheme Supporting Idle Mode in Heterogeneous Mobile Networks, vol. 17, No. 2 of the Dissertations for the 34TH Fall Conference of the Korea Information Processing Society (Nov. 2010), Nov. 12-13, 2010.
Raiciu et al., How Hard Can It Be? Designing and Implementing a Deployable Multipath TCP, USENIX NSDI 2012.
DAPS: Intelligent Delay-Aware Packet Scheduling for Multipath Transport—XP 32632726. IEEE ICC 2014—Communication QoS, Reliability and Modeling Symposium. Nicolas Kuhu, France. Dated Aug. 28, 2014. pp. 1222-1227.
Mitigating Receiver's Buffer Blocking by Delay Aware Packet Scheduling in Multipath Data Transfer—XP 55685291. 2013 27th International Conference on Advanced Information Networking and Applications Workshops. Golam Sarwar, Australia. Dated Jul. 1, 2013. pp. 1119-1124.
European Office Communications dated Apr. 20, 2020, issued in European Application No. 17 834 677.1—1215.
European Search Report dated Oct. 18, 2021, issued in European Application No. 17 834 677.1.

* cited by examiner

FIG. 7A

| Path2 delay(ms) | Path1-only | 6 | 10 | 20 |
|---|---|---|---|---|
| Path1 delay(ms) | | | | |
| Path2-only | | 497 | 493 | 485 |
| 30 | 149 | 636 | 632 | 620 |
| 60 | 148 | 519 | 504 | 490 |
| 100 | 146 | 428 | 423 | 389 |
| 150 | 139 | 381 | 363 | 319 |
| 200 | 135 | 359 | 351 | 306 |
| 250 | 105 | 358 | 346 | 304 |
| 300 | 92 | 374 | 340 | 293 |

FIG. 7B

| Path2 delay(ms) | Path1-only | 6 | 10 | 20 |
|---|---|---|---|---|
| Path1 delay(ms) | | | | |
| Path2-only | | 497 | 493 | 485 |
| 30 | 149 | 634 | 630 | 632 |
| 60 | 148 | 534 | 517 | 493 |
| 100 | 146 | 494 | 489 | 481 |
| 150 | 139 | 495 | 487 | 472 |
| 200 | 135 | 491 | 486 | 474 |
| 250 | 105 | 491 | 486 | 474 |
| 300 | 92 | 493 | 486 | 470 |

METHOD AND APPARATUS FOR TRANSMITTING DATA IN WIRELESS COMMUNICATION SYSTEM

TECHNICAL FIELD

The present disclosure relates to a method and apparatus for transmitting data in multipath transmission.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

On the other hand, end-to-end reliable communication in the Internet environment has traditionally been done using a transmission control protocol (TCP). However, in recent years, as it has become possible to utilize at least one Internet path between ends, the limit of the TCP using only the existing single path has been pointed out. For example, a device such as a smartphone that has been widely used recently has a plurality of network interfaces such as 3G/4G/5G, Wi-Fi, etc., but a general TCP can transmit/receive data through only one interface at a time.

In order to overcome the above-described limitations and to improve performance, there have been proposed techniques capable of transmitting data by simultaneously utilizing a plurality of interfaces of a UE or end-to-end multipath. For example, there is a multipath TCP (MPTCP). The MPTCP is an extension of the existing TCP. If there is one or more paths between ends, a transmission device may generate a TCP subflow for every path and distribute data to each path for transmission. A reception device receiving the data may merge the distributed and transmitted data.

Meanwhile, if data is transmitted/received through a plurality of paths as described above, data transmission rates between the plurality of paths may be different. If a difference in the transmission rates is large, there is a possibility that the merge performance using the plurality of paths may be lower than that when the single path is used due to the restriction of the reception device.

DISCLOSURE OF INVENTION

Technical Problem

Therefore, the present disclosure has been made in view of the above-mentioned problems, and an aspect of the present disclosure is to provide a method for transmitting data at an optimal transmission rate in such a manner that a transmission device restricts the scheduling of data packets on a path even when a transmission rate difference per path occurs.

Solution to Problem

In accordance with an aspect of the present disclosure, there is provided a data transmission method of an apparatus for transmitting data through at least one of a first path and a second path, the method including: identifying a size of data transmittable through the first path during a reference time of the second path; comparing the identified size of the data with a buffer size of a reception device; and determining a transmission mode based on a result of the comparison, and transmitting the data to the reception device according to the determined transmission mode.

In accordance with another aspect of the present disclosure, there is provided an apparatus for transmitting data through at least one of a first path and a second path, the apparatus including: a transceiver configured to transmit and receive a signal; and a controller configured to control the transceiver to identify a size of data transmittable through the first path during a reference time of the second path, to compare the identified size of the data with a buffer size of a reception device, to determine a transmission mode based on a result of the comparison, and to transmit the data to the reception device according to the determined transmission mode.

Advantageous Effects of Invention

According to an embodiment of the present disclosure, a transmission device may restrict the scheduling of data packets on an arbitrary path even when a transmission rate difference per path occurs, thereby transmitting data at a transmission rate of a path having at least a faster transmission rate.

BRIEF DESCRIPTION OF DRAWINGS

FIGS. 7A and 7B are diagrams illustrating effects according to an embodiment of the present disclosure;

MODE FOR THE INVENTION

Figure 1:
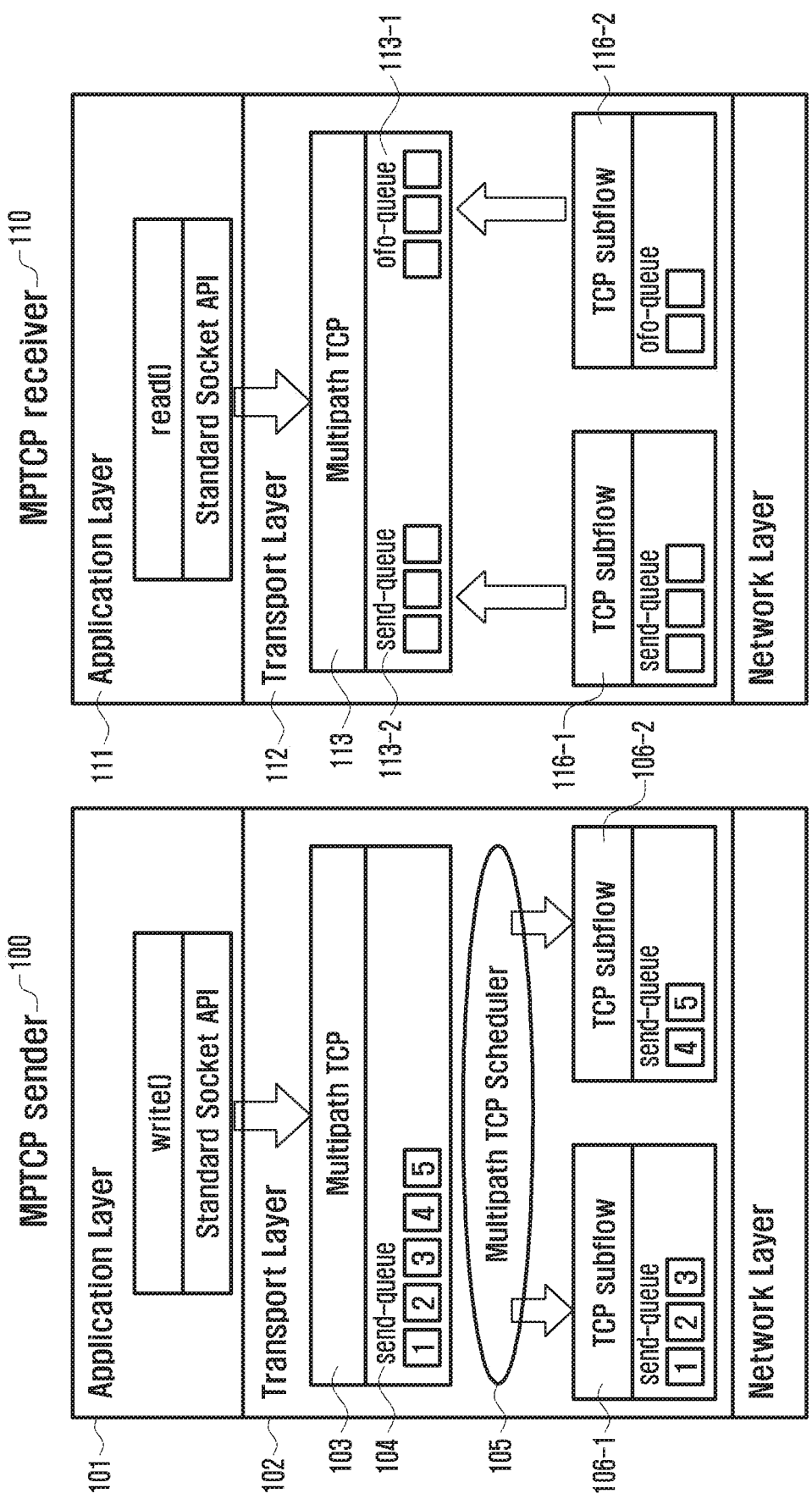
FIG. 1 is a diagram illustrating structures of a transmission device and a reception device each including a transport layer including a multipath transmission control protocol (MPTCP) in general.

Hereinafter, exemplary embodiments of the present disclosure will be described in detail with reference to the accompanying drawings. It should be noted that the same elements will be designated by the same reference numerals although they are shown in different drawings. Further, a detailed description of a known function and configuration which may make the subject matter of the present disclosure unclear will be omitted.

Although an LTE system will be the main object in describing embodiments of the present disclosure in detail, it is to be understood that the subject matter of the present disclosure is also applicable to other communication systems having similar technical backgrounds and channel types, with slight modifications within the scope of the present disclosure, which will be made possible by the discretion of the person skilled in the art.

In the following description of embodiments of the present disclosure, a description of technical features which are well known in the technical field of the present disclosure and are not directly related to the present disclosure will be omitted. Such an omission of unnecessary descriptions is intended to prevent obscuring of the main idea of the present disclosure and more clearly transfer the main idea.

For the same reason, some of components in the accompanying drawings are exaggerated, omitted, or schematically shown. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the i°uniti± or i° modulei± does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" can be either combined into a smaller number of elements or "unit", or further divided into additional elements or "unit". Moreover, the elements and "units" or "modules" may be implemented to reproduce one or more CPUs within a device or a security multimedia card.

In general, in a multipath transmission control protocol (MPTCP), both a transmission device transmitting data and a reception device receiving data must support the MPTCP. Accordingly, the transmission device and the reception device may perform three-way handshaking in order to start TCP communication, and may exchange information about whether the MPTCP is available by including an MP CAPABLE flag in a TCP header option field. If the MPTCP is available in the transmission device and the reception device, the transmission device and the reception device may exchange additional usable IP information and may generate an additional TCP subflow through separate three-way handshaking for each path.

At this time, an MP_JOIN flag is included while the three-way handshaking is performed so that the transmission device and the reception device may know that the connection is added to the existing cession. The number of generated TCP subflows may vary according to the policy of an MPTCP path manager. For example, in the "fullmesh" policy, the same number of subflows as a value obtained by multiplying the number of IPs at each end by each other may be generated. For example, if two IPs are available on a UE side and two IPs are available on a server side, a total of four subflows can be generated by each IP-pair.

FIG. 1 is a diagram illustrating structures of a transmission device and a reception device including transport layers 102 and 112 including MPTCPs 103 and 113 in general.

As shown in FIG. 1, the MPTCPs 103 and 113 can directly interoperate with standard socket APIs in place of existing TCP locations. Under the MPTCPs 103 and 113, a plurality of TCP subflows is generated, and transmission can be performed according to the conventional TCP scheme.

Referring to an MPTCP sender 100 of the transmission device of FIG. 1, data coming from an application layer 101 may be sequentially stored in an MPTCP send-queue 104. A multipath TCP Scheduler 105 may distribute the sequentially stored data to the send-queues of TCP subflows 106-1 and 106-2. Each of the subflows 106-1 and 106-2 that have been distributed with the data is operated as if it was an independent TCP session.

At this time, since the bandwidth, the delay time, and the like are different for each path, it is necessary to match the order of the data received from the TCP subflows 106-1 and 106-2. Therefore, the MPTCP 103 and the TCP subflows 106-1 and 106-2 use different sequence numbers. That is, at the level of the MPTCP 103, data sequence is used (indicating the order of actual application data), and at the level of the TCP subflows 106-1 and 106-2, subflow-sequence is newly attached to the corresponding subflow based on the order of data distributed from the scheduler 105.

For example, data indicated by numbers 1 through 5 in FIG. 1 is accumulated in the MPTCP send-queue 104, and the MPTCP scheduler 105 assigns data #1 through data #3 to the first subflow 106-1 and assigns data #4 and data #5 to the second subflow 106-2.

At this time, in the second subflow 106-2, the data #4 and the data #5 are switched to the subflow-sequences 1 and 2 again, so that transmission of data can be performed. Therefore, although the data received from the TCP subflows 116-1 and 116-2 on a side of an MPTCP receiver 110 arrives in order in terms of the subflow-sequence, if data having preceding data-sequence has not yet arrived from another path, the corresponding data can be moved to an ofo-queue (out-of-order queue) 113-1 of the MPTCP 113. The data moved to the ofo-queue 113-1 may be totally reassembled based on the data-sequence, moved to a receive-queue 113-2, and then transmitted to an application layer 111.

As described above, in the multipath transmission, a situation in which a transmission order and an arrival order are different may frequently occur, and therefore the role of a packet scheduler, which determines which data to send to which path, can be very important.

In general, in a scheduling policy that is used by default in an MPTCP reference code, a method of preferentially using the fastest path may be used (Less-Delay First). According to the above method, the scheduler transmits a data packet through an arbitrary path, and selects a subflow having the fastest round-trip delay (RTT), which is a time required until a feedback signal for the transmitted data packet is received, to assign the corresponding packet. If a TCP congestion window of the fastest subflow is full so that the corresponding data cannot be sent anymore, the scheduler can find the next fastest subflow.

In a case in which the multipath transmission is performed by the above-described method, the merging speed may be lowered if a difference in the transmission rates is large for each transmission path. For example, in a case in which there are two paths between the transmission device and the reception device, if a difference between the RTTs of the two paths is large, data transmitted on a fast path can fill the ofo-queue of the MPTCP before data transmitted on a slow path arrives. Therefore, if a receive buffer becomes full, the subflow on the fast path will not be able to transmit any further data.

Figure 2A:
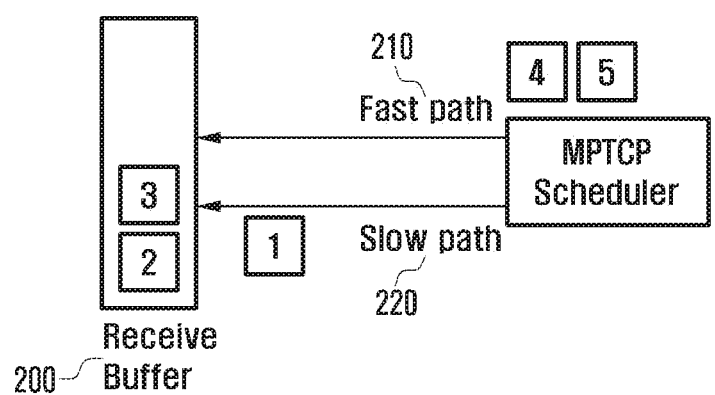
FIGS. 2A and 2B are diagrams illustrating a general buffer-blocking (or head-of-line blocking) problem.
Figure 2B:
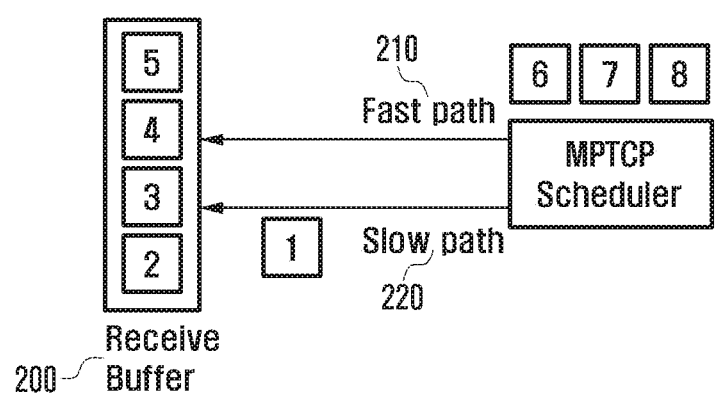

Specifically, FIGS. 2A and 2B are diagrams illustrating a general buffer-blocking (or head-of-line blocking) problem. First, FIG. 2A is a diagram illustrating a case in which a difference in the transmission rate between two paths is not large. According to FIG. 2A, a receive buffer 200 may still have a free space even before data transmitted on a slow path 220 arrives at the receive buffer 200. Therefore, no reduction in the transmission rate may occur on a fast path 210.

On the other hand, if the difference in the transmission rate between the fast path 210 and the slow path 220 increases as shown in FIG. 2B, the receive buffer 200 may be filled with the data transmitted on the fast path 210 before data (data #1 in FIG. 2B) transmitted on the slow path 220 arrives. Therefore, after the receive buffer 200 is full, transmission of data to the fast path 210 is limited.

In order to solve the above-described problem, if the receive buffer 200 is filled with out-of-order data, a method of retransmitting data that has not arrived yet (data #1 in FIG. 2B) on the fast path 210 may be used (opportunistic retransmission). If the receive buffer 200 becomes empty through the retransmission, transmission of data can be resumed from the next number (data #6 in FIG. 2B) of the transmitted data packet. However, in the above-described method, there is a possibility that the data that has been sent on the slow path 220 may be repeatedly transmitted by the retransmission of all the data. Therefore, in order to minimize the possibility, a function of reducing a TCP congestion window value of the slow path 220 in half can be used together (penalization). Nevertheless, if both the paths 210 and 220 are used at the same time, transmission of data on the fast path 210 may be frequently restricted.

For example, if data is transmitted through Wi-Fi, which has a transmission rate of several hundred Mbps in the 802.11ac standard, it is possible to easily fill the receive buffer of a UE even with a difference in the RTT several times. Therefore, degradation in the merging performance of the Wi-Fi path and another path may frequently occur. If the size of the receive buffer is very large, a problem of the degradation in the performance may not occur. However, since the memory size of the UE is generally limited, there may be a difficulty in increasing the size of a TCP receive buffer to such an extent that it is not influenced by the difference in the transmission rate for each path.

Therefore, in order to solve the above-mentioned problems, in the following, in a case where multipath transmission is performed in an environment in which a difference in the transmission rate between a plurality of paths is large, a packet scheduling method capable of ensuring the transmission rate of at least a fast path regardless of the size of the receive buffer will be described.

Specifically, when a situation in which the receive buffer is limited due to the use of the slow path is predicted, the scheduler of the apparatus may restrict packet scheduling on the slow path, and may perform scheduling again if the situation of the slow path is improved later. Therefore, even when any one path becomes very congested or the transmission rate thereof is slowed down, a problem in which the transmission rate of the other path is reduced due to buffer-blocking can be solved.

Figure 3:
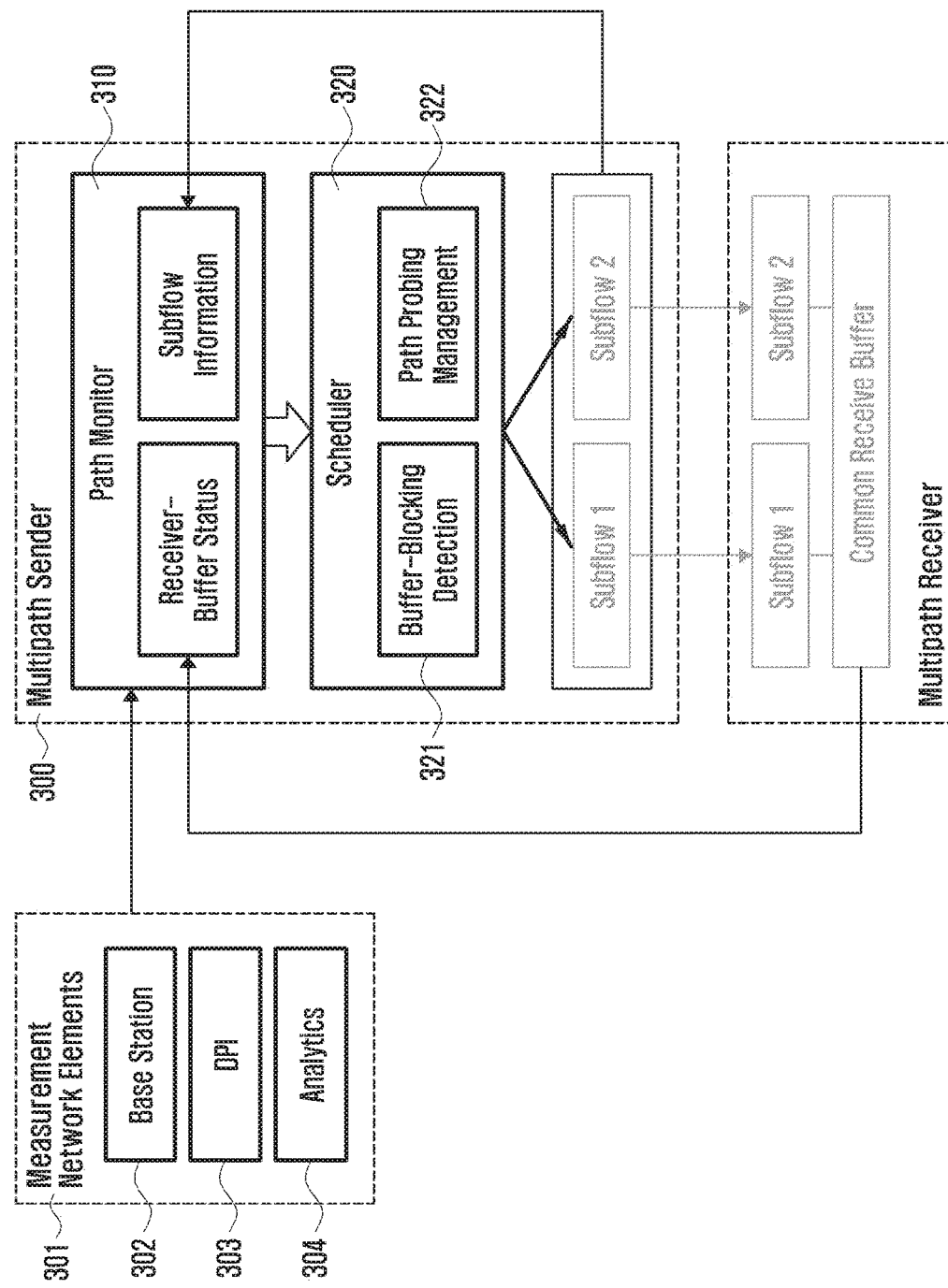
FIG. 3 is a diagram illustrating components of an apparatus for transmitting and receiving data according to an embodiment of the present disclosure.

FIG. 3 is a diagram illustrating components of an apparatus for transmitting and receiving data according to an embodiment of the present disclosure.

An MPTCP sender 300 shown in FIG. 3 may include a path monitor 310 for collecting information necessary for scheduling and a scheduler 320 designed to avoid buffer-blocking.

Specifically, the path monitor 310 may collect information necessary for detecting a buffer-blocking condition. For example, the path monitor 310 may identify buffer status information of a reception device and transmission-related information (e.g., RTT, congestion window, or the like) on a subflow on a transmission side. The information may be acquired through feedback such as ACK in the case of TCP, or may be acquired through another measurement network element 301. For example, the path monitor 310 may receive information on the congestion state of the network or a downlink transmission rate from a base station 302, a DPI 303, or an analytics device 304. The scheduler 320 may use the received information for scheduling.

Meanwhile, a buffer blocking detector 321 of the scheduler 320 may determine whether a receive buffer-blocking phenomenon occurs based on the information acquired through the path monitor 310 (buffer-blocking detection).

As a result of the determination, if it is determined that the receive buffer-blocking phenomenon occurs, the scheduler 320 may suspend the scheduling with a slow subflow. However, it is necessary to keep transmission-related information such as the RTT at the latest value even for a subflow in which the scheduling is restricted in case that the situation of the path (e.g., the transmission rate) changes later. For example, a path probing management unit 322 of the scheduler 320 may perform management to allow packet scheduling for path probing. Therefore, it is possible to perform a function of retransmitting probing data, which has been scheduled on a slow subflow, directly on a fast subflow so that buffer-blocking does not occur.

A method by which the scheduler 320 of the MPTCP sender determines whether the receive buffer-blocking phenomenon occurs will be described. For example, the scheduler 320 may perform the following operations when data coming from an application layer is scheduled with each subflow.

Specifically, the path monitor 321 of the scheduler 320 may acquire the number of transmittable packets per RTT of the fast path ($TxData_{fast}$), an RTT of the fast path ($Delay_{fast}$), an RTT of the slow path ($Delay_{slow}$), a maximum segment size of the fast path ($MSS_{fast}$), the number of packets transmitted on the fast path ($in\_flight_{fast}$), the number of packets transmitted on the slow path ($in\_flight_{slow}$), and a receive buffer size (rwnd).

The path monitor 321 may update the above information every time the data coming from the application layer is scheduled with each subflow.

The buffer-blocking detector 321 of the scheduler 320 may determine whether the receive buffer-blocking phenomenon occurs based in the information acquired through the path monitor 310 (buffer-blocking detection).

Specifically, the buffer-blocking detector 321 may calculate the size of data that can be transmitted on the fast path during the period $Delay_{slow}$ according to Equation 1.

$$\text{Rcv\_queued}_{fast} = TxData_{fast} s \frac{Delay_{slow}}{Delay_{fast}} sMSS_{fast} \quad \text{Equation 1}$$

$TxData_{fast}$ denotes the number of packets transmittable during a reference time (RTT) on the fast path, $Delay_{slow}$ denotes a reference time (RTT) for the slow path, $Delay_{fast}$ denotes a reference time (RTT) for the fast path, and $MSS_{fast}$ denotes an MSS for the fast path. Alternatively, $MSS_{fast}$ may be regarded as the size of one transmission packet for the fast path.

$TxData_{fast}$ is a value that can be changed according to the congestion state of the fast path and the slow path. For example, when applied to the TCP, $TxData_{fast}$ may be applied to min ($inJlight_{fast}$, $cwnd_{fast}/2$) or the like ($cwnd_{fast}$ is congestion window of the fast path) and used.

Figure 4:
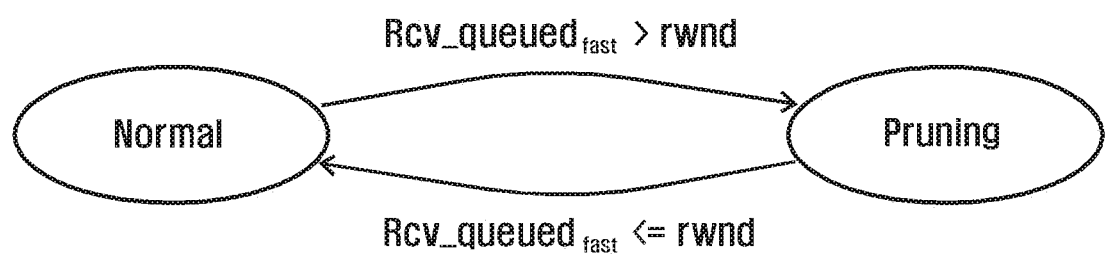
FIG. 4 is a diagram illustrating a method by which a transmission device determines a transmission state (or a transmission mode) according to an embodiment of the present disclosure.

At this time, as shown in FIG. 4, the scheduler 320 may determine the transmission state (or transmission mode) by comparing a value of $TxData_{fast}$ with the receive buffer size rwnd. For example, the scheduler 320 may determine whether to restrict scheduling on the slow path.

For example, the scheduler 320 may determine the scheduling state to be normal to transmit data using both the fast and the slow path. The scheduler 320 may determine a state for restricting scheduling on the slow path as a pruning state.

Specifically, if the value of $TxData_{fast}$ is smaller than or equal to the receive buffer size rwnd, the scheduler 320 may use an existing scheduling algorithm as is in the normal state. For example, if the value of $TxData_{fast}$ is smaller than the receive buffer size rwnd, transmission of the fast path may not be restricted even if the slow path is used. Therefore, the scheduler 320 may maintain the normal state or may be switched to the normal state.

On the other hand, if the value of $TxData_{fast}$ is larger than the receive buffer size rwnd, the scheduler 320 may be switched to the pruning state to restrict the scheduling on the slow path. For example, if the value of $TxData_{fast}$ is larger than the receive buffer size rwnd, the receive buffer-blocking phenomenon may occur. Accordingly, the scheduler 320 may be switched to the pruning state, and may not perform scheduling for data transmission on the slow path other than the data packet transmission for probing.

Figure 5:
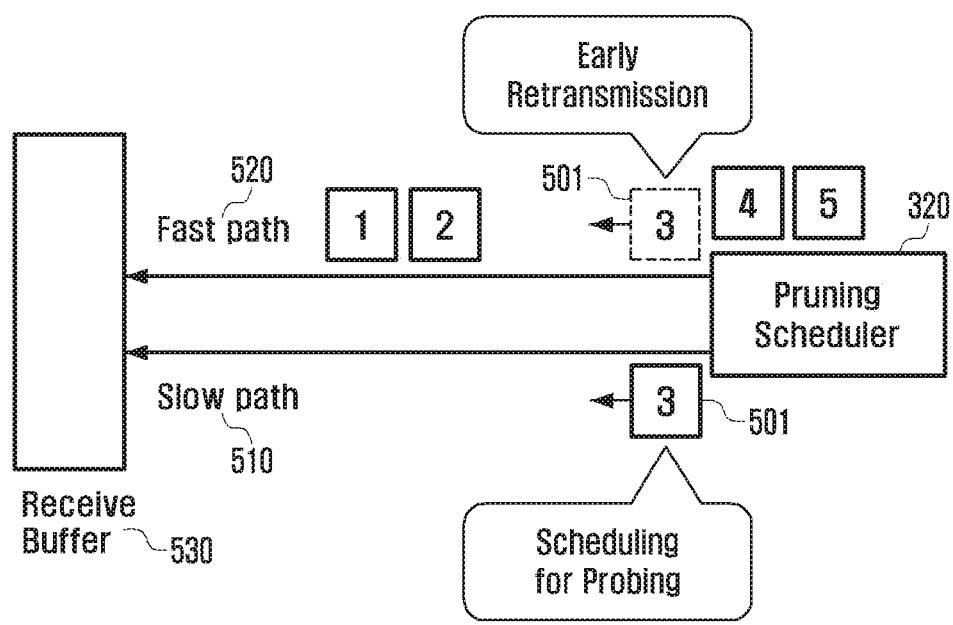
FIG. 5 is a diagram illustrating a probing operation according to an embodiment of the present disclosure.

FIG. 5 is a diagram illustrating a probing operation according to an embodiment of the present disclosure.

Specifically, in the pruning state, the scheduler 320 may perform probing to the slow path. For example, the scheduler 320 may continuously measure an RTT of the slow path, and may allow scheduling on the slow path once every time in_flight$_{slow}$ becomes zero (or per RTT). When scheduling on the slow path is allowed, in_flight$_{slow}$ becomes equal to or greater than 0, and the scheduler 320 may retransmit the packet transmitted on the slow path directly on the fast path. Specifically, since the receive buffer-blocking phenomenon may occur due to the scheduled packet transmission, the scheduler 320 may retransmit the same packet as the packet, which has been scheduled on the slow path, on the fast path to prevent the receive buffer-blocking phenomenon.

As shown in FIG. 5, assuming that in_flight$_{slow}$ is 0 at the point of time when a packet #3 501 is scheduled, during the pruning state, the scheduler 320 may schedule the packet #3 501 on a slow path 510 and transmit the scheduled packet. Next, the scheduler 320 may retransmit the packet #3 501 directly on the fast path 520 to prevent the occurrence of the blocking of the receive buffer. Since in_flight$_{slow}$ becomes 0 or more from the following packet #4, packet scheduling may be performed only on the fast path 520 again.

Even though the packet is transmitted through the slow path 510 so that the packet #3 501 arrives at the reception device twice, the reception device may discard one packet among the repeatedly received packets.

In addition, the scheduler 320 may determine that the transmission rate of the slow path 510 is still slow through the probing operation on the slow path 510. Specifically, when a feedback (for example, ACK) for the packet #3 is received from the reception device including the receive buffer 530, the apparatus may measure the RTT of the slow path 510. Next, based on the measured result, the scheduler 320 may determine a transmission state according to Equation 1 at the time of performing the next scheduling.

Accordingly, the scheduler 320 may determine to maintain the pruning state or to change to the normal state.

Meanwhile, in an RTT measurement method, in general, the TCP may calculate an RTT representative value (smoothed RTT) according to Equation 2 whenever an RTT sample value (RTT) is obtained.

$$\text{smoothed\_RTT} = \text{smoothed\_RTTS}\alpha + \text{RTTS}(1-\alpha) \quad \text{Equation 2}$$

For example, 0.875 (7/8) may be used as an α value in an operating system (Linux). That is, a low weight of ⅛ is assigned to a newly measured RTT sample value to perform an update.

Meanwhile, according to an embodiment of the present disclosure, if smoothed_RTT on the slow path is updated in the pruning state, it is necessary to use only a very small number of probing packets. Therefore, in order to quickly reflect path information which is currently changed, it is desirable to assign a higher weight to the sample value rather than the representative value. If the smoothed_RTT value is updated by the probing packet, an α value lower than ⅞ may be used (for example, ⅛ may be used as the α value)

The α value of ⅛ or ⅞ is only an example, and the α value may be a real number of more than 0 and less than 1.

Meanwhile, in the above-described embodiment of the present disclosure, a case in which one path is fast and the other path is slow for two paths has been described. According to another embodiment of the present disclosure, the above-described method can be applied to multipath transmission of three or more multiple paths having different transmission rates.

For example, if there are subflows in the order in which RTT is faster from 1 to n, rcv_queued$_{fast}$ calculated according to Equation 1 may be extended to rcv_queuedr$_{fast}$ for a specific path r (1≤r≤N). Next, the scheduler 300 may determine whether a reduction in the transmission rate due to buffer-blocking may occur on the paths from 1 to r−1 by using the path r.

Specifically, the scheduler 300 may calculate rcv_queuedr$_{fast}$ as shown in Equation 3.

$$\text{Rcv\_queued}^r_{fast} = \overset{r-1}{\underset{i=1}{Q}} TxData_i s \frac{RTT_r}{RTT_i} sMSS_i \quad \text{Equation 3}$$

Accordingly, if rcv_queuedr$_{fast}$ is greater than rwnd, the scheduler 300 may define the path r as a slow path. Next, the scheduler 300 may perform the operation in the pruning state as described above, with respect to the path determined as the slow path.

Meanwhile, the case in which the operations according to the embodiment of the present disclosure are performed through the scheduler 300 and the buffer blocking detector 321 and/or the path probing management unit 322 included in the scheduler 300 has been descried, but this is only an embodiment and is not limited to the names of the components performing the respective operations. For example, the above-described operations may be performed by the controller or a processor of the apparatus.

Figure 6:
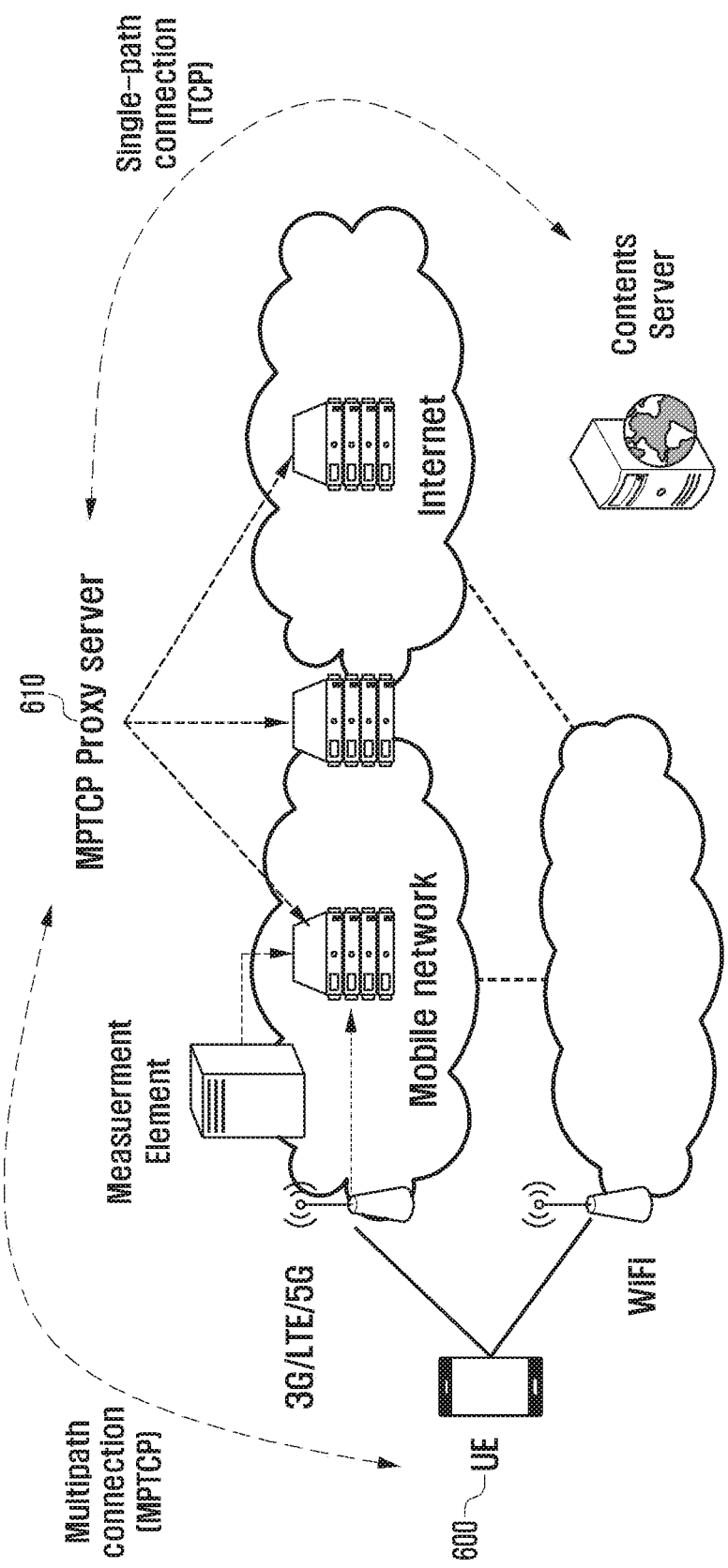
FIG. 6 is a diagram illustrating an embodiment of a case in which the present disclosure is applied to an MPTCP (or multipath transmission is possible) proxy server.

The scheduling method according to an embodiment of the present disclosure can be applied to all types of servers or UEs that perform MPTCP or multipath transmission. FIG. 6 is a diagram illustrating an embodiment of a case in which the present disclosure is applied to an MPTCP (or multipath transmission is possible) proxy server.

Specifically, a UE 600 first establishes a connection with an MPTCP proxy server through multiple connections, and establishes a connection with a final destination to which the UE wants to connect again using a TCP in an MPTCP proxy server 610. The MPTCP proxy server 610 may perform a relay between the connection with the UE 600 and the connection with the final destination (If a final destination server supports multipath transmission, direct multipath transmission between the UE and the final destination server is possible without proxy. In this case, the embodiment of the present disclosure can be applied to the final destination server). The MPTCP proxy server 610 may exist on a mobile network, directly behind the mobile network (e.g., a connection with SGi), or on the Internet. When the MPTCP proxy server 610 exists on the mobile network, the MPTCP proxy server 610 may receive more accurate information on the network status from a base station or another measurement element, and may utilize the received information at the time of packet scheduling. Otherwise, the MPTCP proxy server 610 may perform packet scheduling by utilizing information such as the RTT and the receive buffer size measured at the time of data transmission in the conventional TCP.

Meanwhile, FIGS. 7A and 7B are diagrams illustrating effects according to an embodiment of the present disclosure.

The results shown in FIGS. 7A and 7B are examples according to a case where a proxy server is provided between a client and a server and the client and the proxy server support an MPTCP and do not support the server. In this case, the results may be obtained according to an embodiment in which the client may communicate with the server via the proxy, and the proxy may establish an MPTCP connection with the client and performs relay between the client and the server.

FIG. 7A is a diagram illustrating a result obtained by performing scheduling by a general method. FIG. 7B is a diagram illustrating a result of a case where the proxy server performs a scheduling operation according to an embodiment of the present disclosure.

In FIG. 7A, the Path1-only performance is 149 Mbps if a path 1 delay is 30 ms, and the Path2-only performance is 497 Mbps if a path2 delay is 6 ms. Accordingly, the ideal merging performance if the delay is 30 ms or 6 ms can be 149+497=646 Mbps.

As shown in FIG. 7A, it can be seen that the merging speed starts to be slower than that of the Path2-only performance at the point of time if the Path1 delay starts to exceed 100 ms.

On the other hand, as shown in FIG. 7B, as to the MPTCP performance according to an embodiment of the present disclosure, the performance close to the minimum path2-only performance may be exhibited regardless of a delay difference.

Figure 8:
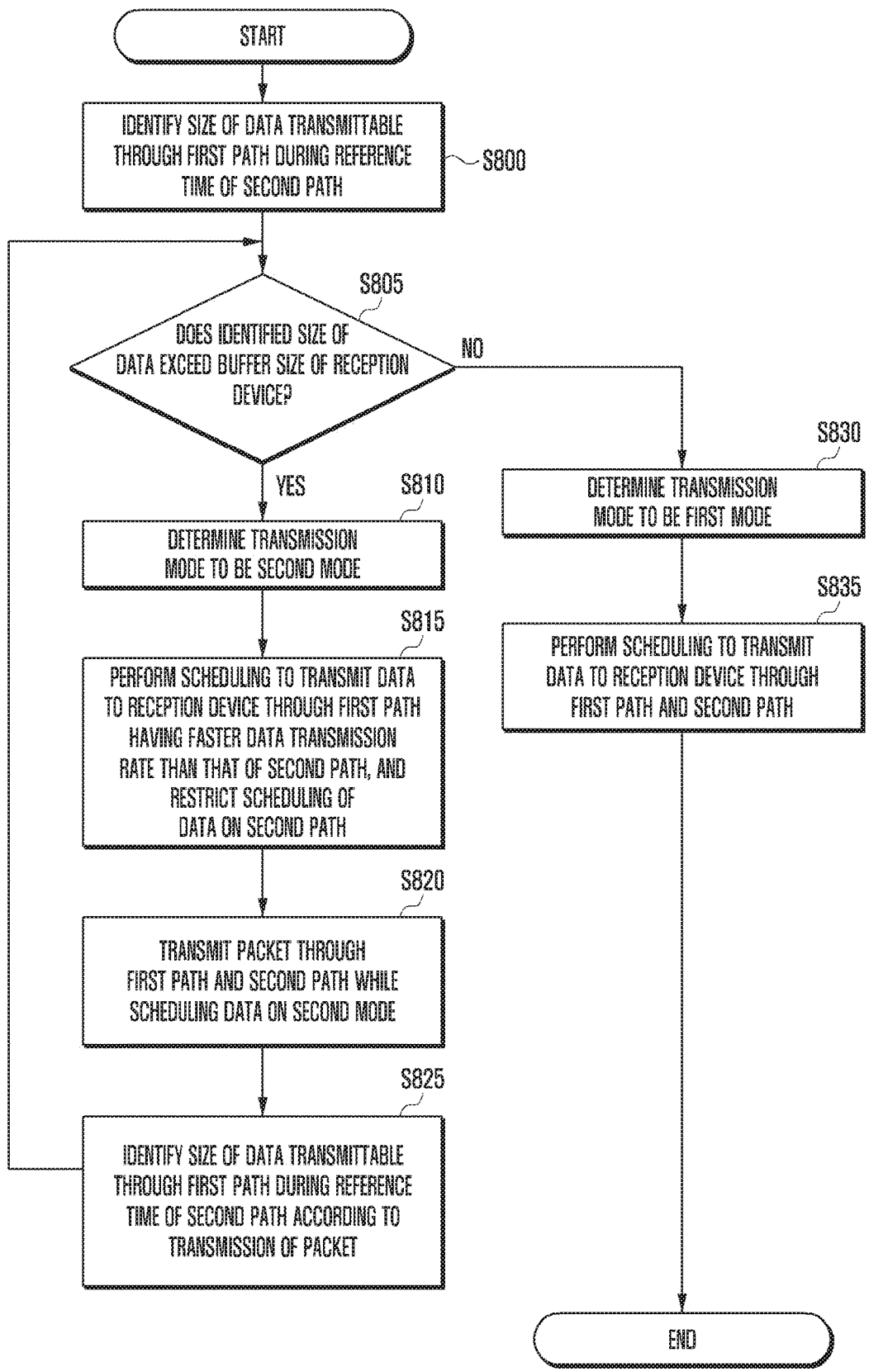
FIG. 8 is a flowchart illustrating a method of an apparatus according to an embodiment of the present disclosure.

Meanwhile, FIG. 8 is a flowchart illustrating a method of an apparatus according to an embodiment of the present disclosure.

First, in operation S800, the apparatus identifies a size of data transmittable through a first path during a reference time of a second path. Specifically, the second path may be a path with a slower transmission rate than that of the first path, and the first path may be a path with a faster transmission rate than that of the second path. For example, the apparatus may identify the size of data that can be transmitted through the first path during the reference time of the second path using Equation 1.

In operation S805, the apparatus determines whether the identified size of the data exceeds a buffer size of a reception device. For example, when an ACK signal for a data packet transmitted to the reception device is received, the apparatus may identify the buffer size of the reception device based on information included in the ACK signal. Thus, the apparatus can determine whether the identified size of the data exceeds the buffer size of the reception device.

If the identified size of the data exceeds the buffer size of the reception device based on the determination result, the apparatus determines a transmission mode to be a second mode in operation S810. In operation S815, the apparatus performs scheduling to transmit data to the reception device through the first path having the faster data transmission rate than that of the second path according to the second mode, and restricts the scheduling of data on the second path.

Specifically, the second mode may be a mode in which the apparatus performs scheduling to transmit an arbitrary packet, which has been transmitted through the first path, through the second path at a predetermined interval while performing scheduling to transmit a data packet through the first path.

Accordingly, in operation S802, the apparatus transmits the arbitrary packet through the first path and the second path while scheduling data in the second mode. For example, the apparatus may transmit the arbitrary packet through the first path and the second path, once per RTT of the second path.

Next, in operation S825, the apparatus identifies the size of data that can be transmitted through the first path during a reference time of the second path, according to the transmission of the arbitrary packet.

The apparatus that has identified the size of the data that can be transmitted through the first path during the reference time of the second path by the transmission of the arbitrary packet may proceed to operation S805 again.

On the other hand, when it is determined in operation S805 that the identified size of the data does not exceed the buffer size of the reception device, the apparatus may proceed to operation S830 and determine the transmission mode to be the first mode.

Accordingly, in operation S835, the apparatus may perform scheduling to transmit data to the reception device through the first path and the second path. For example, the apparatus may perform scheduling to transmit data in a general MPCTP method.

The case in which the control method of the apparatus shown in FIG. 8 is performed by the apparatus has been described, but each operation may be performed by the apparatus, the controller of the apparatus, or the scheduler of the apparatus.

Figure 9:
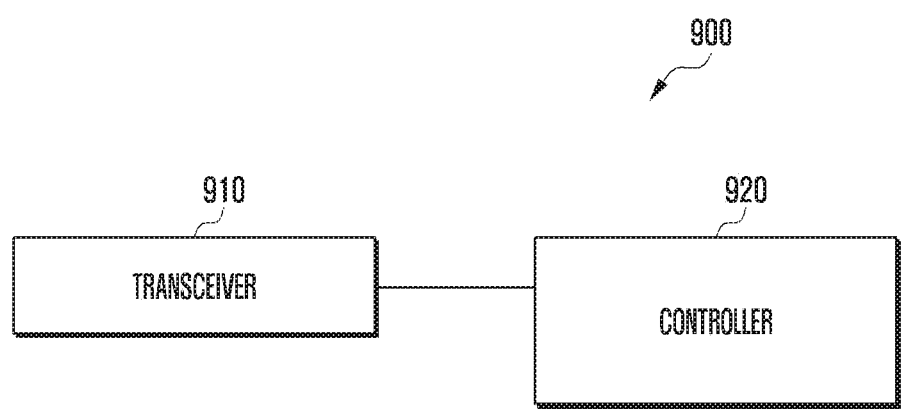
FIG. 9 is a block diagram illustrating components of an apparatus according to an embodiment of the present disclosure.

Meanwhile, FIG. 9 is a block diagram illustrating components of a transmission device 900 according to an embodiment of the present disclosure.

The transmission device 900 may include a transceiver 910 and a controller 920. The transmitter 910 is a component for transmitting and receiving signals.

In addition, the controller 920 may control the transmission device 900 as a whole.

Specifically, the controller 920 may identify a size of data that can be transmitted through the first path during a reference time of the second path. Next, the controller 920 may compare the identified size of the data with a buffer size of a reception device. The controller 920 may determine a transmission mode based on the comparison result, and may transmit data to the reception device according to the determined transmission mode.

Meanwhile, if the identified size of the data is equal to or less than the buffer size of the reception device, the controller 920 may determine the transmission mode to be a first mode in which scheduling is performed to transmit data to the reception device through the first path and the second path.

In addition, if the identified size of the data exceeds the buffer size of the reception device, the controller 920 may perform scheduling to transmit data to the reception device through the first path having a faster data transmission rate than that of the second path, and may determine the transmission mode to be a second mode in which scheduling of data on the second path is restricted.

As to restriction of the scheduling of the data on the second path, scheduling is performed to transmit an arbitrary packet, which has been transmitted through the first path, through the second path at a predetermined interval while scheduling is performed to transmit a data packet through the first path.

In addition, the controller 920 may transmit the arbitrary packet through the first path and the second path while being operated in the second mode, and may identify the size of the data that can be transmitted through the first path during a reference time of the second path according to the transmission of the arbitrary packet. Next, the controller 920 may determine whether to transmit data through the second path based on the identified result.

Next, if the size of the data that can be transmitted through the first path during the reference time of the second path is equal to or less than the buffer size of the reception device according to the transmission of the arbitrary path based on the identified result, the controller 920 may be switched to the first mode in which data is transmitted to the reception device through the first path and the second path.

On the other hand, if the size of the data exceeds the buffer size of the reception device, the controller 920 may maintain the second mode.

In addition, as to the comparison, the size of the data and the buffer size of the reception device may be compared according to Equation 1 as described above.

Meanwhile, the reference time may be a time (RTT) required until the data packet is transmitted through the arbitrary path and a feedback signal for the transmitted data packet is received from the reception device.

According to the transmission device 900 described above, even when multipath transmission is performed in an environment with a large difference in the transmission rate between the paths, at least a fast transmission rate of the path can be ensured irrespective of the receive buffer size.

Meanwhile, the scheduling method of the apparatus according to various embodiments described above may be software-coded and stored in a non-transitory readable medium. Such a non-transitory readable medium may be mounted and used in various devices.

The non-transitory readable medium is not a medium for storing data for a short time such as a register, a cache, a memory, etc., but means a medium that semi-permanently stores data and can be read by a device. Specifically, the non-transitory readable medium may be a CD, a DVD, a hard disk, a Blu-ray disk, a USB, a memory card, a ROM, or the like.

Although specific exemplary embodiments of the present disclosure have been illustrated and described, it should be appreciated that the present disclosure is not limited thereto. It will be apparent that various modifications and changes may be made by those skilled in the art without departing from the scope of the present disclosure as defined by the appended claims, and these modifications and changes should not be construed separately from the technical idea or view of the present disclosure.

The invention claimed is:

1. A data transmission method of an apparatus for transmitting data through at least one of a first path or a second path, the method comprising:
identifying a maximum amount of data transmittable through the first path during a reference time of the second path, the reference time of the second path being longer than a reference time of the first path;
comparing the identified maximum amount of data with a buffer size of a reception device;
determining a transmission mode as a second mode for restricting scheduling of data on the second path and transmitting data to the reception device through the first path, in case that the identified maximum amount of data exceeding the buffer size of the reception device;
transmitting a packet through the first path and the second path simultaneously at a predetermined interval while the transmission mode is the second mode, the predetermined interval comprising at least one of when a number of packets transmitted on the second path becomes zero or every round-trip time (RTT) of the second path;
determining whether to maintain the transmission mode as the second mode based on a result of the transmission of the packet; and
transmitting the data to the reception device according to the determination of the transmission mode.

2. The method of claim 1, further comprising:
determining the transmission mode as a first mode in which scheduling is performed to transmit data to the reception device through the first path and the second path in case that the identified maximum amount of data is equal to or less than the buffer size of the reception device.

3. The method of claim 1, further comprising:
identifying the maximum amount of data transmittable through the first path during the reference time of the second path according to the transmission of the packet; and
determining whether to transmit data through the second path based on the result of the comparison.

4. The method of claim 3, further comprising:
switching the transmission mode to a first mode in which data is transmitted to the reception device through the first path and the second path based on the identified maximum amount of data being equal to or less than the buffer size of the reception device according to the transmission of the packet based on the result of the comparison; and
maintaining the second mode based on the identified maximum amount of data exceeding the buffer size of the reception device.

5. The method of claim 1, wherein the comparing comprises
comparing the identified amount of data with the buffer size of the reception device according to an equation:

$$\text{Rcv\_queued}_{fast} = TxData_{fast} s \frac{Delay_{slow}}{Delay_{fast}} sMSS_{fast},$$

where $\text{Rcv\_queued}_{fast}$ denotes the identified maximum amount of data, $TxData_{fast}$ denotes a number of packets transmittable through the first path during the reference time, $Delay_{slow}$ denotes the reference time of the second path, $Delay_{fast}$ denotes a reference time of the first path, and $MSS_{fast}$ denotes a maximum segment size (MSS) of the first path, and
wherein the reference time is an RTT between a data packet being transmitted through a path and a feedback signal for the transmitted data packet being received from the reception device.

6. An apparatus for transmitting data through at least one of a first path or a second path, the apparatus comprising:
a transceiver configured to transmit and receive a signal; and
a controller configured to:
control to identify a maximum amount of data transmittable through the first path during a reference time of the second path, the reference time of the second path being longer than a reference time of the first path,
compare the identified maximum amount of data with a buffer size of a reception device,
determine a transmission mode as a second mode for restricting scheduling of data on the second path and transmitting data to the reception device through the first path, in case that the identified maximum amount of data exceeding the buffer size of the reception device,
control the transceiver to transmit a packet through the first path and the second path simultaneously at a predetermined interval while the transmission mode is the second mode, the predetermined interval comprising at least one of when a number of packets transmitted on the second path becomes zero or every round-trip time (RTT) of the second path, determine whether to maintain the transmission mode as the second mode based on a result of the transmission of the packet, and control the transceiver to transmit the data to the reception device according to the determination of the transmission mode.

7. The apparatus of claim 6, wherein the controller is further configured to determine the transmission mode as a first mode in which scheduling is performed to transmit data to the reception device through the first path and the second path, in case that the identified maximum amount of data is equal to or less than the buffer size of the reception device.

8. The apparatus of claim 6, wherein the controller is further configured to:

identify the maximum amount of data transmittable through the first path during the reference time of the second path according to the transmission of the packet, and determine whether to transmit data through the second path based on the result of the comparison.

9. The apparatus of claim 8, wherein the controller is further configured to:

switch the transmission mode to a first mode in which data is transmitted to the reception device through the first path and the second path based on the identified maximum amount of data being equal to or less than the buffer size of the reception device according to the transmission of the packet based on the result of the comparison, and control to maintain the second mode based on the identified maximum amount of data exceeding the buffer size of the reception device.

10. The apparatus of claim 6, wherein the controller is further configured to compare the identified maximum amount of data with the buffer size of the reception device according to an equation:

$$\text{Rcv\_queued}_{fast} = \text{TxData}_{fast} s \frac{Delay_{slow}}{Delay_{fast}} sMSS_{fast},$$

where $\text{Rcv\_queued}_{fast}$ denotes the identified maximum amount of data, $\text{TxData}_{fast}$ denotes a number of packets transmittable through the first path during the reference time, $Delay_{slow}$ denotes the reference time of the second path, $Delay_{fast}$ denotes a reference time of the first path, and $MSS_{fast}$ denotes a maximum segment size (MSS) of the first path.

11. The apparatus of claim 6, wherein the reference time is an RTT between a data packet being transmitted through a path and a feedback signal for the transmitted data packet being received from the reception device.

* * * * *